E. F. WOODWARD.
Coffee Pot.
No. 65,461.             Patented June 4, 1867.
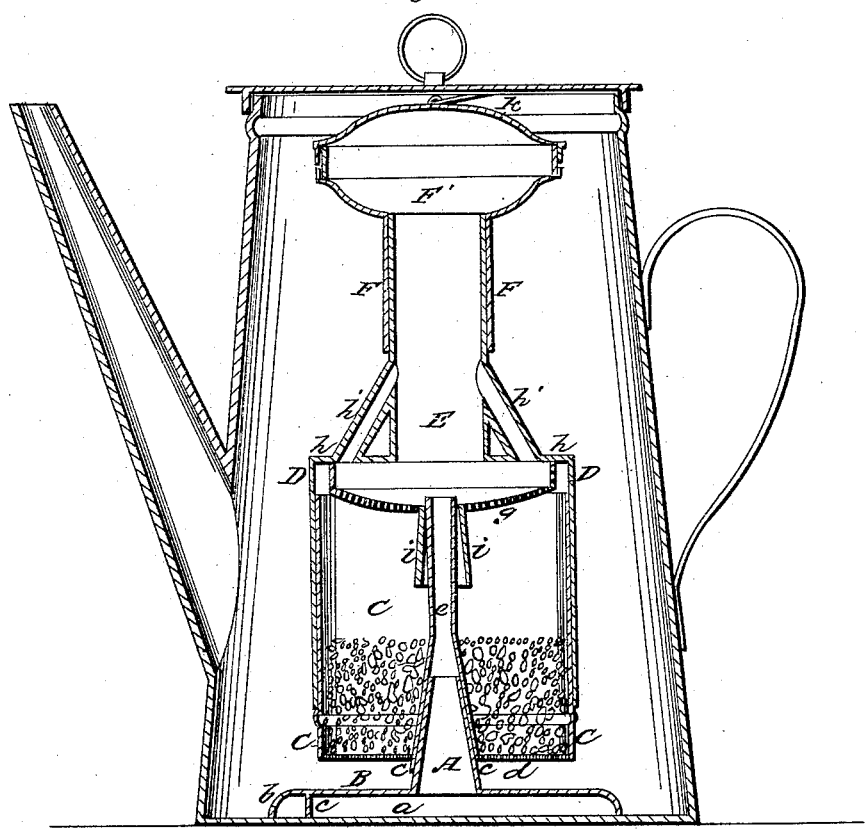
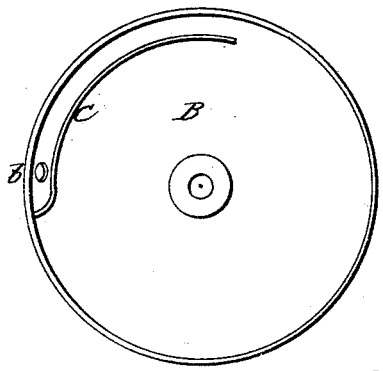

United States Patent Office.

EDWARD F. WOODWARD, OF BROOKLYN, NEW YORK.

*Letters Patent No. 65,461, dated June 4, 1867.*

COFFEE-POT.

*The Schedule referred to in these Letters Patent and making part of the same.*

TO ALL WHOM IT MAY CONCERN:

Be it known that I, EDWARD F. WOODWARD, of Brooklyn, in the county of Kings, and State of New York, have invented a new and useful improvement in Coffee-Boilers; and I do hereby declare that the following is a full, clear, and exact description thereof, which will enable others skilled in the art to make and use the same, reference being had to the accompanying drawings, forming part of this specification, in which—

Figure 1 is a central vertical section of my improved fountain percolator, shown in connection with a coffee-pot.

Figure 2 is a bottom view.

Similar letters of reference indicate like parts.

The design of this invention is to furnish house-keepers with an apparatus for boiling tea, coffee, cocoa, or other vegetable substances, and extracting therefrom their virtue and flavor, and retaining the same in all their original strength and delicacy. This apparatus is an improvement upon an invention for accomplishing the same object, for which Letters Patent were granted to me, dated twenty-fifth day of March, 1862, from which invention it differs materially, however, not only in construction and mode of operation, but also in its being a detached independent apparatus, which may be used in connection with ordinary coffee-pots, boilers, or sauce-pans.

My improved fountain percolator directs a current of boiling water and steam among and through the ground coffee, tea, or other substance contained in the receiver, and returns the steam into the water, thereby extracting and preserving the aromatic principle which is usually dissipated and lost. By this means not only a great saving is effected, but the most precious and delicious element of coffee, tea, &c., which gives to these products their value as table beverages, is thus perfectly extracted and retained in the decoction.

The taper metal tube A, at the bottom of the apparatus, is attached to an inverted saucer or cup, B, which is so formed in order to enclose a space, $a$, under it when it is set down upon the bottom of a coffee-pot or boiler, as shown in fig. 1, the coffee-pot being indicated in red lines, with the detached fountain percolator introduced as intended for use. In the edge of the bottom cup B is a hole, $b$, for the admission of water from the coffee-pot, as hereinafter described; and in the inside, leading from the hole $b$, is a guide-plate, $c$, which may be employed or not, and is not essential, but promotes rapid circulation. A cylindrical cup, C, designed for a receiver to contain the ground coffee, tea, or other substance, has plain sides and top, and a perforated flat bottom, $d$, passing through which bottom is a taper tube, $e$, the lower end of which fits over the tube A, and the upper end of which is left open on a level with the top of the cup C. Another cup, D, is inverted and fitted over the cup C so as to extend nearly to its bottom; and in the upper part of the cup D is placed a perforated plate, $g$, a little below the top $h$, through which perforated plate $g$ passes a tube, $i$, that fits over the upper end of the tube $e$. On the top of the cup D is fastened a large cylindrical tube, E, and two smaller branch tubes, $h'$ $h'$, which open into the larger tube E. Another tube, F, is fitted nicely over the upper end of the tube E, and is provided with a cup top, F', having on it a movable cover, $k$. This apparatus, as seen in the drawing, is detached, and may be used with any ordinary coffee-pot; and the upper tube F is so fitted on the tube E that it may be adjusted by placing it higher or lower, so that the lid of a coffee-pot shall bear upon the cover $k$, and keep the apparatus steady when the water boils. The coffee, tea, or other substance, is placed in the receiving-cup C with the proper quantity of water in the pot. The water will enter the hole $b$ into the space $a$ under the inverted cup B, where it will be acted upon by the fire, the heat of which, thus directly conveyed to the water under the cup B, will cause it to boil and flow with a rapid current up through the tubes A and $e$, from which it flows like a fountain, and, passing down through the perforated plate $g$ into the ground coffee, &c., in the cup C, then passes out through the perforated bottom $d$ into the coffee-pot again, and thus makes a circuit, which is kept up constantly, until the rapid percolation of boiling water among the coffee, &c., in the cup C extracts all its virtues. The steam generated will pass up the large tube E, and, condensing in the top F', will find its way back through that tube and the smaller tubes $h'$ into the receiver, and thus restore to the decoction the aromatic volatile principles which rise with the steam, and usually escape and are lost.

Having thus described my invention, I claim as new, and desire to secure by Letters Patent—

The detached fountain percolator, constructed as described, consisting of the taper metal tube A upon the inverted cup B, and supporting the cylindrical cup C with the perforated bottom, through which the taper tube $e$ passes, tube $i$, cup D, with the perforated plate $g$, tube E F, branch tubes $h'$, cup top F', and cover $k$, combined and operating substantially as described for the purpose specified.

The above specification of my invention signed by me this 6th day of March, 1867.

EDWARD F. WOODWARD.

Witnesses:
WM. F. MCNAMARA,
ALEX. F. ROBERTS.